May 11, 1954          J. C. DE PEW          2,677,889
TROUSER LENGTH MEASURING AND MARKING APPARATUS
Filed April 16, 1951          2 Sheets-Sheet 2
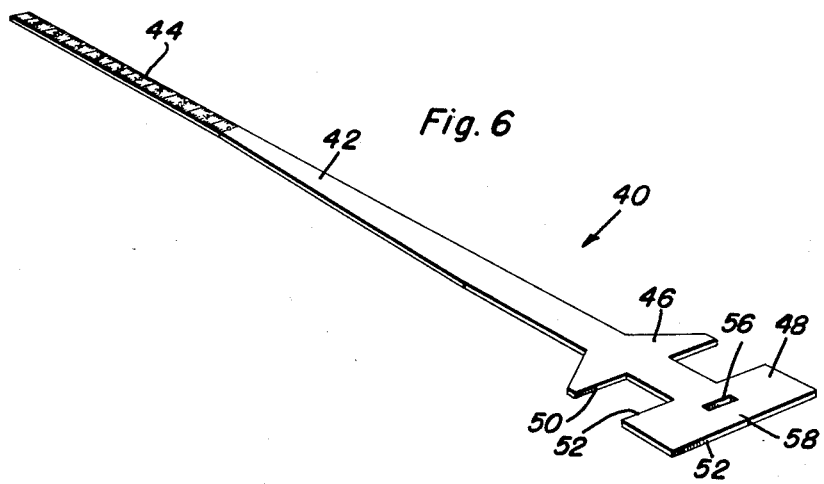
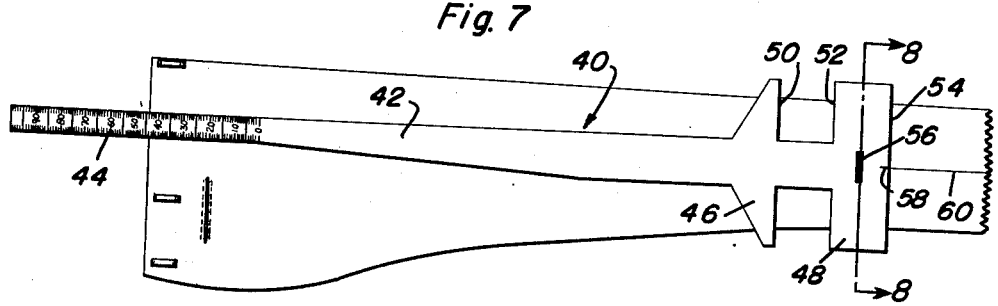
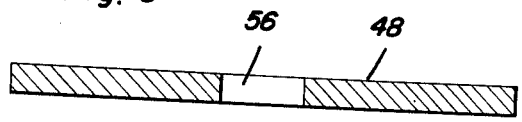
Jesse C. De Pew
INVENTOR.

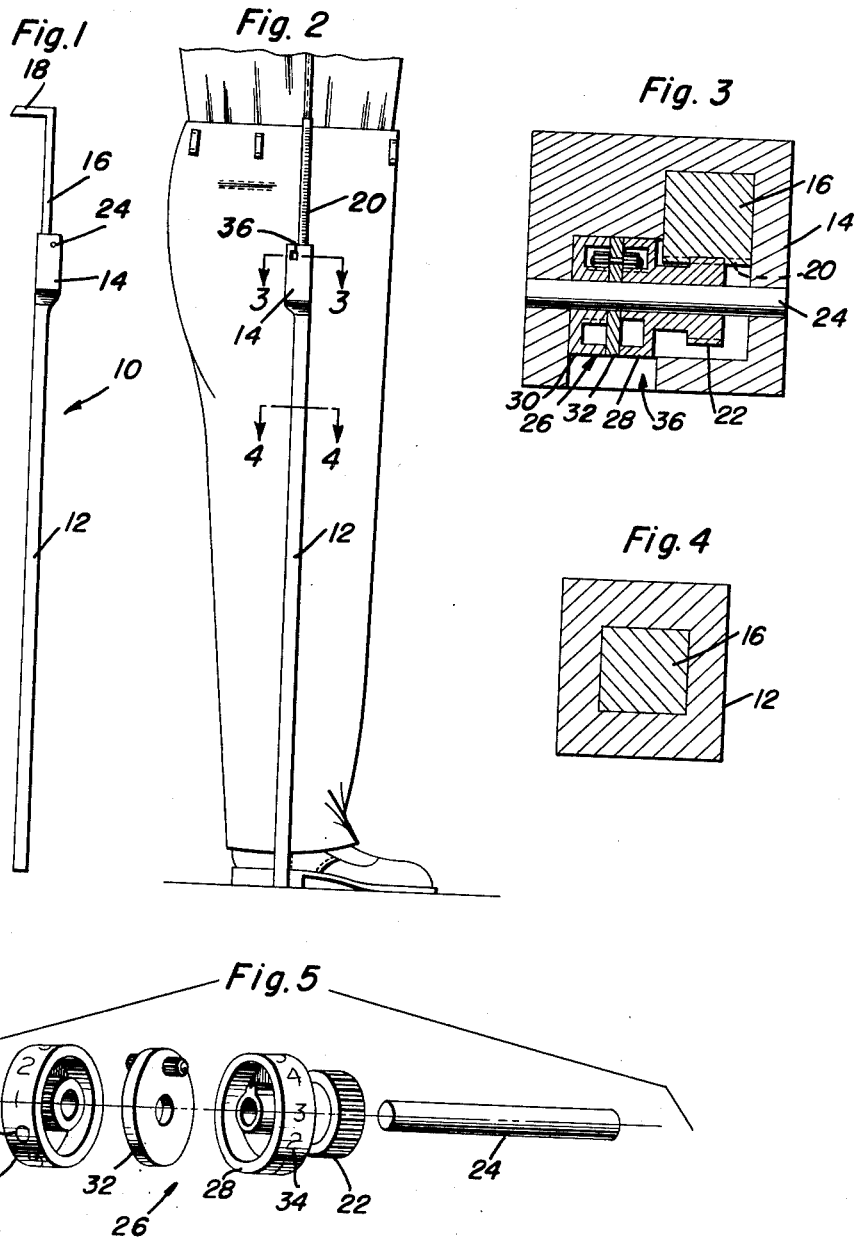

Patented May 11, 1954

2,677,889

UNITED STATES PATENT OFFICE 2,677,889

TROUSER LENGTH MEASURING AND MARKING APPARATUS

Jesse C. De Pew, Columbia, Mo.

Application April 16, 1951, Serial No. 221,249

2 Claims. (Cl. 33—2)

This invention relates to new and useful improvements and structural refinements in devices for measuring and marking the length of trousers, the principal object of the invention being to facilitate convenient, expeditious and highly dependable performance of these operations.

Basically, the invention contemplates the provision of two separate and distinct devices, one for measuring and one for marking, and these two devices will be separately described.

Some of the advantages of the invention lie in its simplicity of construction, in its efficient, expeditious and dependable operation, and in its adaptability for use by persons without any special training or skill.

With the above more important objects and features in view and such other objects and features as may become apparent as this specification proceeds, the invention consists essentially in the arrangement and construction of parts as illustrated in the accompanying drawings, in which:

Figure 1 is a side elevational view of the length measuring device;

Figure 2 is an elevational view of the length measuring device in use;

Figure 3 is a sectional detail, taken substantially in the plane of the line 3—3 in Figure 2;

Figure 4 is a sectional detail, taken substantially in the plane of the line 4—4 in Figure 2;

Figure 5 is a group perspective view of the indicator used in the measuring device;

Figure 6 is a perspective view of the marking device;

Figure 7 is a plan view of the marking device in use; and

Figure 8 is a sectional detail, taken substantially in the plane of the line 8—8 in Figure 7.

Like characters of reference are employed to designate like parts in the specification and throughout the several views.

Measuring device

Referring now to the accompanying drawings in detail, and particularly to Figures 1-5, inclusive, the measuring device is designated generally by the reference character 10 and embodies in its construction a vertically elongated, hollow body 12 which is provided at its upper end with a sectionally enlarged portion affording a housing 14.

An elongated gauging member 16 is slidably telescoped in the body 12 and projects upwardly therefrom, the upper end of the member 16 being provided with a laterally projecting extension or arm 18.

To prevent rotation of the member 16 relative to the body 12, the member 16 is preferably polygonal, as shown, and as is best shown in Figure 2, the member 16 is provided at one side thereof with a toothed rack 20 which meshes with a pinion 22 mounted upon a shaft or pin 24 extending transversely of the housing 14, as is clearly shown in Figure 3.

The pinion 22 actuates a rotary indicator assembly 26 which is of a conventional type commonly used in speedometers, or the like, the indicator assembly 26 including a series of counter wheels 28, 30, the wheel 28 being rotatable directly with the pinion 22, while the wheel 30 is driven by the wheel 28 through the medium of a drive member 32, so that the wheel 30 makes ones complete revolution for every ten revolutions of the wheel 28. The wheels 28, 30 are provided on the periphery thereof with suitable indicia 34 which are visible through a suitable window or opening 36 in one side of the housing 14.

It will be apparent from the foregoing that sliding of the gauging member 16 relative to the body 12 will actuate the indicator assembly 26, and when the invention is placed in use, the laterally extending extension or arm 18 of the member 16 is applied to the waist at the upper edge of the trousers, as shown in Figure 2, and the body 12 is permitted to slide downwardly relative to the member 16 until the lower end of the body 12 contacts the ground or floor, this action causing the indicator assembly 26 to register the distance of travel of the body 12 relative to the member 16, which distance is, in turn, coordinated by the indicia 34 so as to indicate a numeral, preferably a two-digit numeral, corresponding to or representative of the length of the trouser leg at the outseam.

Marking device

Referring now to the accompanying Figures 6-8, inclusive, which illustrate a marking device designated by the general reference character 40, this marking device consists of an elongated, strap-like body 42 provided on one end portion thereof with a graduated scale 44, the indicia of which correspond to readings such as may be obtained from the indicator assembly 26 of the measuring device 10.

The opposite end portion of the body 42 is equipped with a plurality of transversely extending, mutually spaced members 46, 48 which afford a series of guiding edges 50, 52, and 54, and, in addition, it will be noted that the member 48 is provided at the center thereof with a transversely extending slot 56.

The member 48 is also marked at the center of its edge 54 with a center line 58, and when the marking device is placed in use it is positioned flatly on the outseam of a pair of trousers so that the outseam (indicated at 60) is in register with the center line 58 while the upper, waist edge of the trousers is aligned with the appropriate indicia on the scale 44, corresponding to the reading taken from the measuring device indicator 26.

Thereupon, chalk may be used for marking transverse lines on the trouser legs along the edges 50, 52, and 54, the line drawn at the edge 54 indicating where the trouser leg is to be cut off, while the line drawn along the edge 52 indicates where the cuff is to be turned inwardly in the usual manner, and the line drawn along the edge 50 indicates where the material is to be turned outwardly for pressing and tacking so as to complete the cuff.

When trousers are to be finished without cuffs, a point is marked on the trouser leg through the slot 56, whereupon the entire device is slid upwardly so that the lower edge 54 thereof is in register with the chalk mark made through the slot, and then transverse lines are chalk-marked along the edges 52, 54, the line marked at 54 indicating where the material is to be cut off, while the line 52 indicates where the material is to be turned under and pressed.

It is believed that the advantages and use of the invention will be clearly understood from the foregoing disclosure and, accordingly, further description thereof at this point is deemed unnecessary.

Having described the invention, what is claimed as new is:

1. A trouser length measuring device comprising a vertically elongated hollow body adapted at its lower end to engage the ground and having an enlarged upper end portion providing a housing having a lateral sight opening in communication therewith, a transverse shaft provided in said housing, a rotary indicator mounted on said shaft and visible through said opening, a vertically elongated gauging member slidable in said hollow body and adapted at its upper end to engage the waist of a user, and a toothed rack provided on said gauging member, said indicator including a drive pinion operatively engaging said rack.

2. A trouser length measuring device comprising an elongated tubular member having its lower end adapted to engage the ground and having its upper end enlarged to provide a chamber laterally of its bore, said enlarged upper end being provided with a sight opening in communication with the chamber, a rotatable transfer shaft disposed within said chamber, a rotary indicator mounted on said shaft, said indicator being confined within said chamber and being visible through said sight opening, and an elongated gauging member telescopically received in the tubular member and projecting from the upper end thereof to engage the waist of the user, said gauging member having a portion thereof formed as a toothed rack, said rotary indicator including a pinion meshed with said rack.

References Cited in the file of this patent

UNITED STATES PATENTS

| Number | Name | Date |
|---|---|---|
| 886,354 | Darling | May 5, 1908 |
| 1,198,499 | Widland | Sept. 19, 1916 |
| 1,224,938 | Lenker | May 8, 1917 |
| 1,425,175 | Childs | Aug. 8, 1922 |
| 1,456,547 | Gruber | May 29, 1923 |
| 1,728,893 | Langsner | Sept. 17, 1929 |
| 1,754,334 | Quigley | Apr. 15, 1930 |
| 2,133,417 | Black | Oct. 18, 1938 |
| 2,370,980 | Magnet | Mar. 6, 1945 |
| 2,493,618 | Compiano | Jan. 3, 1950 |
| 2,604,696 | Nelson | July 29, 1952 |